Figure 1:
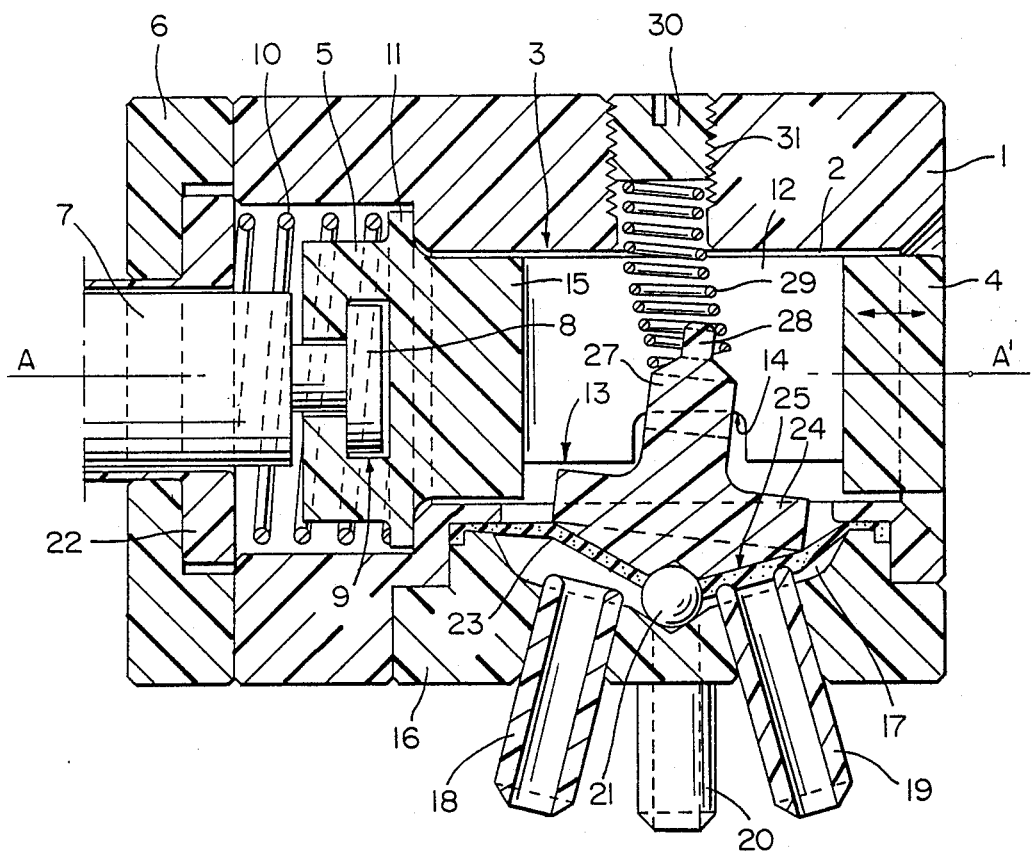

United States Patent [19]

Champseaux

[11] Patent Number: 4,986,308
[45] Date of Patent: Jan. 22, 1991

[54] SWITCHING MICROELECTROVALVE HAVING A SINGLE MEMBRANE

[75] Inventor: Serge Champseaux, Les Mureaux, France

[73] Assignee: ABX, Levallois Perret, France

[21] Appl. No.: 517,519

[22] Filed: Apr. 30, 1990

Related U.S. Application Data

[63] Continuation of Ser. No. 338,432, Apr. 14, 1989, abandoned, which is a continuation of Ser. No. 141,869, Jan. 11, 1988, abandoned.

[30] Foreign Application Priority Data

Jan. 12, 1987 [FR] France ............... 87 00209

[51] Int. Cl.5 ........................... F16K 11/052
[52] U.S. Cl. .................. 137/625.44; 251/75; 251/129.2; 251/331; 137/875
[58] Field of Search ........... 251/75, 129.2, 33, 129.15; 137/875, 863, 869, 625.44

[56] References Cited

U.S. PATENT DOCUMENTS

| | | | |
|---|---|---|---|
| 2,562,631 | 7/1951 | Morrison | 137/144 |
| 2,935,086 | 5/1960 | Lehman et al. | 137/599.1 |
| 3,067,764 | 12/1962 | Geary | |
| 3,067,942 | 12/1982 | Renne | 137/625.44 X |
| 3,991,788 | 11/1976 | Kull | 137/863 |
| 4,251,053 | 2/1981 | Wurzer | |
| 4,285,497 | 8/1981 | Guttel | 137/875 X |

FOREIGN PATENT DOCUMENTS

| | | |
|---|---|---|
| 7324333 | 6/1973 | Fed. Rep. of Germany . |
| 2223605 | 10/1974 | France . |
| 481335 | 12/1969 | Switzerland . |
| 1226481 | 3/1971 | United Kingdom . |

Primary Examiner—Alan Cohan
Attorney, Agent, or Firm—Fleit, Jacobson, Cohn, Price, Holman & Stern

[57] ABSTRACT

The invention provides a fluid switching microelectrovalve in which the mobile member playing the role of closure member for one or other of the pipes (18,19) is a single membrane (23) with oriented deformation applied by a rocker (24) against one or other of the pipes to be closed, the rocker (24) being moved from one to the other of its two balance positions corresponding to the two closure positions of the membrane by a spool (3) sliding in the valve body (1) under the action of the core of an electromagnet.

13 Claims, 2 Drawing Sheets

U.S. Patent   Jan. 22, 1991   Sheet 1 of 2   4,986,308

SWITCHING MICROELECTROVALVE HAVING A SINGLE MEMBRANE

This application is a continuation of application Ser. No. 338,432, filed Apr. 14, 1989, abandoned, which is a continuation application of Ser. No. 141,869, filed Jan. 11, 1988, abandoned.

The invention, which relates to a switching microelectrovalve for all fluids and particularly for aggressive or impurity laden liquids, has more precisely as object a microelectrovalve with a rocker and a single membrane.

It is known that the purpose of manual or motor driven two or three way valves is to close the passage of a fluid through a pipe or to orientate a fluid from a supply pipe to one or other of two distribution pipes. For that, the valve body to which these pipes are connected is usually provided with a mobile assembly which, depending on its position, opens or closes a port.

In a three way valve, the mobile assembly closes a port while opening another and conversely and it is formed for example of a pivoting plate carrying a flexible sealing element or else a closure valve with two faces moving in translation in a case between two opposite ports. These assemblies, especially if they are driven by a motor, or—as is the usual case in electrovalves—by an electromagnet must be carefully constructed so that the sealing is correct, even after frequent use. That very often implies complementary adjustment systems associated with return springs, arrangements which all complicate the product and make it heavier. Although that is not too important for current use, when it is a question for example of orientating water at normal pressure from a main pipe towards a branch pipe, it is not at all the same in certain fields of use, such as in the medical field, where conventional electrovalves cannot be used. In this case of application, in fact, the risk cannot be taken that the liquids concerned may leak from the electrovalve or that conversely they may be reached or polluted by an external medium whatever it may be. Furthermore, the desired microelectrovalves must often be of small size, light and able to be controlled by a low power electromagnet.

To overcome these problems, the approach is known which consists in using a closure member which uses two plastic material membranes mounted on each side of a core which passes through a central well provided in the body of the electrovalve. These membranes which are flexible may be deformed in their case and close ports which open thereinto while opening other ports, and that under the action of the core of an electromagnet. It is also known to construct a microelectrovalve such as the one described in the application Ser. No. 86 08908 in the name of the applicant, which is capable of withstanding relatively high pressures although of reduced size, which lends itself to the transfer of all fluids.

The microvalves of this type, however—because of the existence of the two membranes—use two cases for the intake or discharge of fluid, and a sealed connection device between the two: the membrane-connection assembly forming a single mobile assembly driven by the same core. That involves the construction of several small sized parts whose assembly is delicate and adjustment difficult so that the closure of the membranes on their seat is constant. Moreover, the dead fluid volume existing in the cases of each membrane is thus not inconsiderable, which may be a drawback for the transfer of very small fluid flowrates.

The invention provides a new approach which avoids these preceding drawbacks and which has the advantage of being simpler to construct at the same time as being much more reliable in operation.

An object of the present invention relates then to a switching microelectrovalve having at least two ways including a valve body in a compartment of which fluid intake and discharge pipes arrive and a mobile member playing the role of closure member for one or other of these pipes and controlled by the core of an electromagnet, in which microelectrovalve the mobile member is a single membrane with oriented deformation applied by a rocker against one or other of the pipes to be closed and in which the rocker is moved from one to the other of its two balance positions corresponding to the two closure positions of the membrane by a control piece moving in the valve body under the action of the core of the electromagnet.

According to a main feature of the invention, the control piece is a spool sliding in the body of the valve, which control spool is placed in a well passing through the valve body along its longitudinal axis, one of its ends being flush with an outlet port, not closed, of said well and its central part having an opening which passes therethrough over the whole of its thickness parallel to its axis.

Advantageously, the central part of the spool is cut in a plane perpendicular to the plane of the opening so as to form a land between the axis and a generatrix of the spool, two notches being provided transversely to the land and at the center thereof.

According to another feature of the invention, the membrane is nipped between the edges of a cylindrical opening provided on a lateral face of the valve body and a profiled flange which closes said opening and which has passing therethrough three small fluid supply or discharge pipes which open into the small chamber defined by said flange and the membrane.

In yet another feature of the invention, the rocker has the general shape of a spinning top, whose lower conical face bears on the upper face of the membrane under the action of a spring and pivots on a ball provided on the flange and whose upper part includes a rod which is engaged in the opening provided in the spool.

In an advantageous arrangement of the invention, the conical face of the rocker has a central compartment for positioning it on the ball, and said rocker has, on the side opposite its conical face, a cross-piece intended to engage in the notches of the spool.

Figure 4:
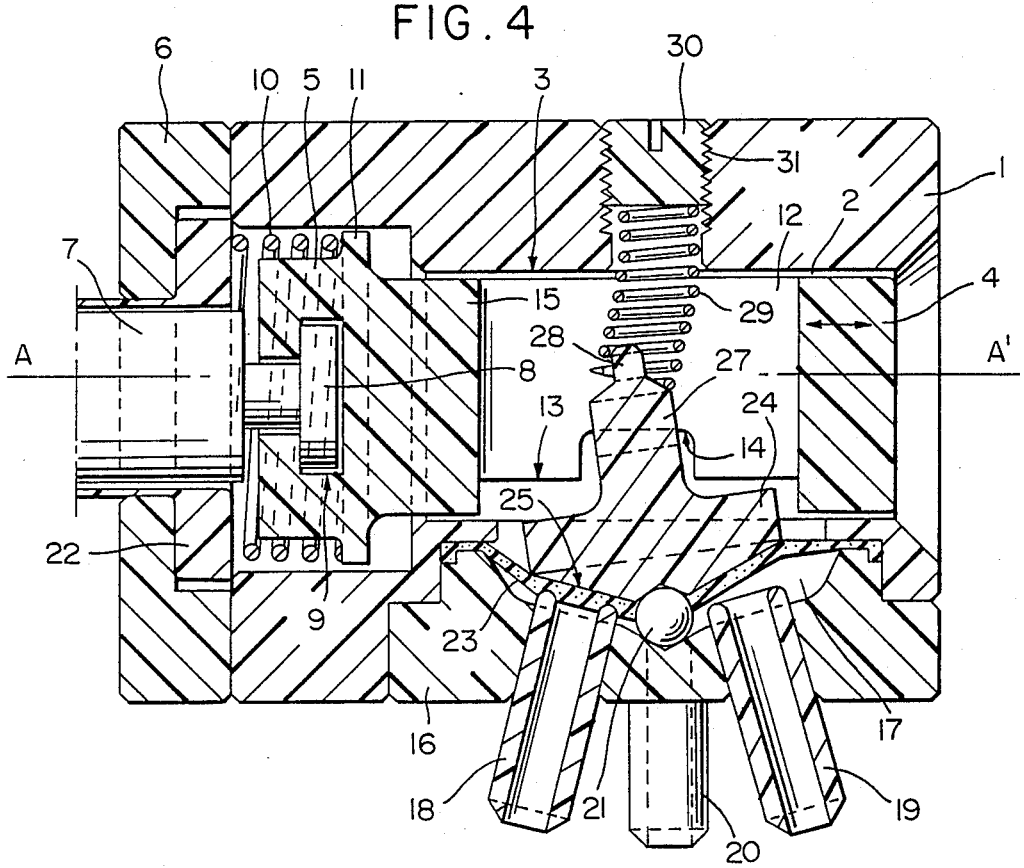
Figure 2:
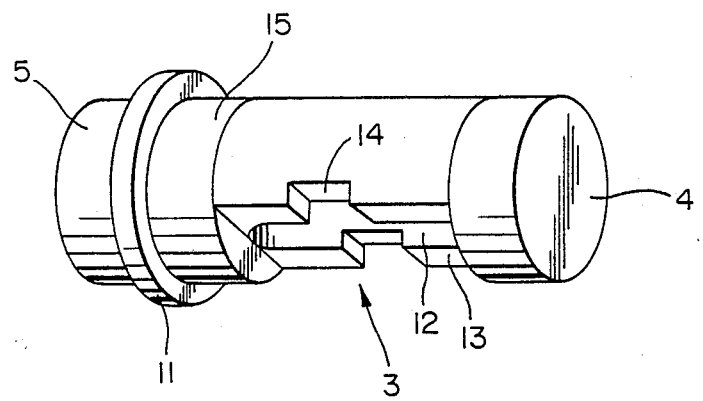
Figure 3:
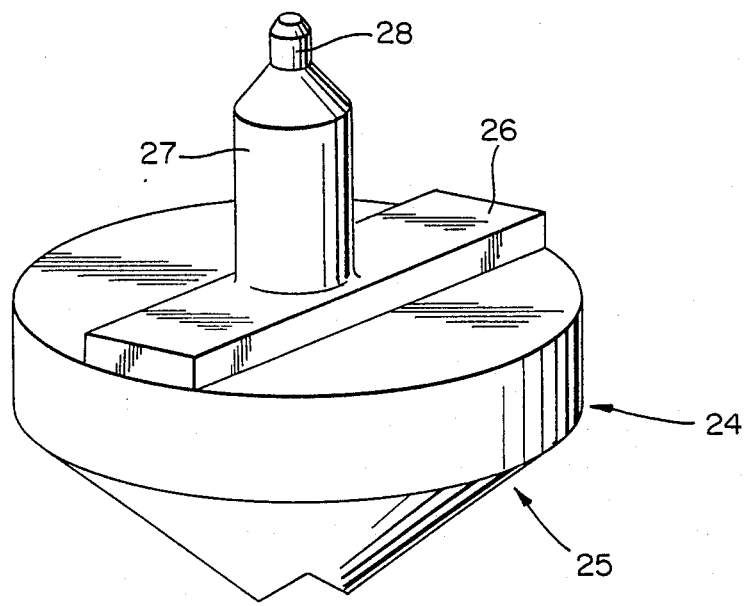

Other particular features and advantages of the invention will be clear from the following description of an embodiment taken by way of non limitative example in which reference is made to the drawings which show:

FIG. 1, a schematical sectional view of the microelectrovalve in the rest position, FIG. 2, a perspective view of the control spool, FIG. 3, a perspective view of the rocker, and FIG. 4, a schematical sectional view of the microelectrovalve in the working position.

The microelectrovalve shown in the drawings has the general form of a rectangular box made from a plastic material which forms the valve body 1. Along its longitudinal axis A—A' it is pierced with a cylindrical shaped well 2 inside which is placed a control spool 3 also shown in FIG. 2. A cylindrical end 4 of the spool slides in the valve body and is flush with an unclosed outlet port of well 2. The opposite end 5 of the spool is also flush with the other outlet port of well 2 which is moreover closed by a connection piece 6 screwed to the valve body and which serves as support for the coil of an electromagnet, not shown. The mobile core 7 of this electromagnet passes through the connection piece and ends in a core head forming an engagement spur 8 which is placed in a recess 9 provided at the end 5 of spool 3. A spring 10 is further inserted between a shoulder 11 on spool 3 in the vicinity of the recess 9, and a sleeve 22 for guiding core 7 interposed between piece 6 and the valve body 1. The central part of spool 3, between its cylindrical end 4 and another cylindrical part 15 adjacent shoulder 11, which both slide in well 2, has an opening 12 which passes through this central part of the spool over the whole of its thickness and which is parallel to the axis A—A'. The central part between the two cylindrical ends 4 and 5 is also cut in a plane perpendicular to the plane of opening 12 so as to form a land 13 between the axis A—A' and a generatrix of the spool. Finally, transversely to this land and in the center thereof, two notches 14 are provided.

A lateral face of the valve body 1 is further provided with a cylindrical opening closed by a flange 16. Between the flange and the edges of the opening of the valve body 1 is nipped a sealing membrane 23 which defines with said flange a small volume chamber 17. Flange 17 has passing therethrough three small fluid supply or discharge pipes 18, 19 and 20. Each of these small pipes opens into said chamber 17. Two pipes 18 and 19 open into chamber 17 inside a ring forming a relief on the bottom of the flange. The third pipe 20 opens directly into the bottom of the flange. In FIG. 1, it can be seen that flange 16 has a very special profile in the form of a cup whose central conical profile part receives a ball 21, interposed at the center of the membrane.

In a variant, not shown, the ball may be integral with flange 16 and integrally molded therewith, as possibly also pipes 18, 19 and 20.

For this, membrane 23 is pierced with a small central orifice. Between membrane 23 and land 13 of spool 3 a free volume is formed in well 2 which serves as housing for a rocker 24. Rocker 24, also shown in FIG. 3, has the general form of a spinning top whose lower conical face 25 is bonded to the upper face of membrane 23. The membrane has then a profile similar to this face 25 and, depending on the orientation of this latter, is deformed as will be made clear further on. This face 25 has a central compartment for positioning the rocker on the ball. Said rocker also has on the side opposite its conical face 25, a cross-piece 26 which is engaged in the notches 14. Above this cross-piece a rod 25 of the rocker is engaged in opening 12 provided in the spool and ends in a spur 28.

In variants, not shown, the membrane 23 and the rocker may be integrally molded together as a single piece.

In FIG. 1 it can be seen that a spring 29 bears on rod 27 and extends inside opening 12 of spool 3 as far as an adjustable stop 30 located in a threaded orifice 31 provided in a lateral face of valve body 1, opposite chamber 17. Cross-piece 26 engaged with a small clearance inside notches 14 allows the rocker to assume a certain slant with respect to a plane perpendicular to the axis A—A', depending on the position of spool 3. Spring 29 exerts then a pressure on the end of rod 27, slanted with respect to this plane, and as it were locks the rocker 24 in its position. Instead of the spring, a resilient strip could also be used fulfilling the same function.

The electrovalve shown operates in the following way. In the rest position illustrated in FIG. 1, the electromagnet is not excited and, under the action of spring 10, spool 3 is held towards the right, its end 4 being flush with the opening of well 2. Rocker 24 is slanted towards the right so that membrane 23 closes pipe 19 but frees pipe 18. The fluid admitted into chamber 17 through pipe 20 passes freely through pipe 18. The bearing pressure exerted by spring 29 on rod 28 is passed on to the face 25 of the rocker on pipe 19 side, the membrane 23 being crushed under the ring of said pipe so as to maintain excellent sealing. As soon as the electromagnet is excited, the core 7 exerts a tractive force on the end 5 of spool 3 through its engagement head 8, against the force of spring 10. Spool 3 then moves so as to occupy the position shown in FIG. 4. During this movement, the edges of notches 14 have driven the edge of the crosspiece 26 and caused the rocker 24 to pivot. The spur 28 at the end 27 of said rocker has moved inside the spring 29 which itself has rocked leftwards. As soon as the rocker has gone beyond an intermediate position in a plane perpendicular to the axis A—A', spring 29 has accentuated this rocking movement, made possible by the clearance between notches 14 and cross-piece 26. Thus, membrane 23 is rapidly deformed following the slant of the rocker; it then moves away from pipe 19 and is applied against pipe 18. Fluid communication is then established between pipe 20 and pipe 19. Since the membrane 23 can thus be crushed on its seat, there is no risk of a poor closure due to impurities. The switching is fast and unequivocal because the rocker 24 passes from the first balance position shown in FIG. 1 to the second balance position shown in FIG. 4, each one corresponding to one of the two possible positions of the membrane.

As soon as excitation of the electromagnet ceases, spring 10 pushes spool 3 back into the original position shown in FIG. 1. There is automaatic switching locking in this position. It will be noted that the user may also act himself for operating the spool by bearing on the end 4 which is flush with one side of the electrovalve, i.e. the valve remains usable manually should the electromagnet fail.

Since chamber 17 between membrane 23 and flange 16 is of a small size, the dead fluid volume is small which makes rinsing easy. Furthermore, the single membrane plays not only the role of closure valve on its seat but also provides perfect sealing with the external medium and with the well 2 inside which spool 3 slides. This sealing is ensured not only for pressurized liquids but also for gaseous fluids under high or low pressure, even in a vacuum. The size of the valve body 1 is reduced without for all that reducing the passage section for the fluid through pipes 18, 19 and 20.

Because of the clearance between spool 3 and rocker 24, at the level of notches 14, there is no rigidity between the control of the electromagnet and the closure system, therefore no risk of their getting out of adjustment. Furthermore, the closure force of the membrane on one or other of the seats is adjustable by means of the stop 30 independently of the attraction force of the electromagnet. Because rocker 24 is driven by the notches of spool 3 to a high level with respect to its pivoting point formed by ball 21, the lever arm is such that the attraction force of core 7, and consequently the power of the electromagnet, may be small whereas the closure force of the membrane is high.

Moreover, with this particular assembly arrangement, the replacement of the switching system and of the membrane is possible from the outside without necessarily having to remove the valve from the equipment in which it is used.

These advantages mean that these switching microvalves may be mounted and fixed in a battery in a restricted space, the pipes disposed on the same side facilitating their implantation. They are also made from materials capable of withstanding aggressive fluids and find a preferred application in medical analysis equipment as well as in food industries and the like.

In a variant of construction more particularly, not shown, spool 3 could be replaced by a mechanism for example of the spring kind adapted for similarly ensuring movement of the rocker.

What is claimed is:

1. A microelectrovalve having at least two ways, said microelectrovalve comprising a valve body having a compartment, fluid intake and discharge pipes attaching to said compartment, a movable closure member for selectively closing one of said pipes, an electromagnetic core for controlling the position of said movable closure member, said movable closure member comprising a single elastically deformable membrane, a rocker for selectively engaging said membrane against one of said pipes for closing said pipes, and a control spool movable within said valve body under control of said electromagnetic core for moving said rocker to one of two balance positions corresponding to one of two closure positions of the membrane, said membrane being elastically deformable into contact with seats of said pipes; and further comprising a well passing through a longitudinal axis of said valve body, said well having first and second outlet openings, and wherein said control spool is contained in said well and arranged along a longitudinal axis of said valve body, a first end of said spool being flush with an end surface of said valve body when said spool is moved to a position corresponding to one of said two balance positions of said rocker, and a second end of said control spool being proximate said electromagnetic core.

2. Microelectrovalve according to claim 1, and further comprising a connection piece and a sleeve enclosed by said connection piece for guiding said electromagnetic core to close said second outlet opening of said well.

3. Microelectrovalve according to claim 2, and further comprising a spring inserted between a shoulder of the control spool and the sleeve.

4. Microelectrovalve according to claim 1 wherein a central part of said control spool has an opening which passes through said control spool parallel to said longitudinal axis.

5. Microelectrovalve according to claim 4, wherein said central part of said control spool is cut along a plane perpendicular to a plane of said opening so as to form a flat region parallel to the longitudinal axis of the spool.

6. Microelectrovalve according to claim 5, and further comprising two notches provided on said spool transverse to and at the center of said flat region.

7. A microelectrovalve having at least two ways, said microelectrovalve comprising a valve body having a compartment, fluid intake and discharge pipes attaching to said compartment, a movable closure member for selectively closing one of said pipes, an electromagnetic core for controlling the position of said movable closure member, said movable closure member comprising a single elastically deformable membrane, a rocker for selectively engaging said membrane against one of said pipes for closing said pipes, and a control spool movable within said valve body under control of said electromagnetic core for moving said rocker to one of two balance positions corresponding to one of two closure positions of the membrane, said membrane being elastically deformable into contact with seats of said pipes; and further comprising a cylindrical opening on a lateral face of said valve body, a profiled flange closing said cylindrical opening and said profiled flange, and wherein said membrane is nipped between edges of said cylindrical opening; and a small chamber defined by said flange and said membrane, and wherein said fluid intake and discharge pipes open into said small chamber.

8. A microelectrovalve having at least two ways, said microelectrovalve comprising a valve body having a compartment, fluid intake and discharge pipes attaching to said compartment, a movable closure member for selectively closing one of said pipes, an electromagnetic core for controlling the position of said movable closure member, said movable closure member comprising a single elastically deformable membrane, a rocker for selectively engaging said membrane against one of said pipes for closing said pipes, and a control spool movable within said valve body under control of said electromagnetic core for moving said rocker to one of two balance positions corresponding to one of two closure positions of the membrane, said membrane being elastically deformable into contact with seats of said pipes; and further comprising a cylindrical opening on a lateral face of said valve body, a profiled flange closing said cylindrical opening and said profiled flange, and wherein said membrane is nipped between edges of said cylindrical opening; and a ball for acting as a pivoting point for said rocker, and wherein said flange has a cup shaped profile with a central conical profile part for receiving said ball.

9. A microelectrovalve having at least two ways, said microelectrovalve comprising a valve body having a compartment, fluid intake and discharge pipes attaching to said compartment, a movable closure member for selectively closing one of said pipes, an electromagnetic core for controlling the position of said movable closure member, said movable closure member comprising a single elastically deformable membrane, a rocker for selectively engaging said membrane against one of said pipes for closing said pipes, and a control spool movable within said valve body under control of said electromagnetic core for moving said rocker to one of two balance positions corresponding to one of two closure positions of the membrane, said membrane being elastically deformable into contact with seats of said pipes; and further comprising a cylindrical opening on a lateral face of said valve body, a profiled flange closing said cylindrical opening and said profiled flange, and wherein said membrane is nipped between edges of said cylindrical opening; and wherein said spool has an opening therein, and said microelectrovalve further comprises a spring, a rod on said rocker engaging said spring via said opening of said spool, said rocker having the general shape of a spinning top comprising a lower conical face which bears on an upper face of the membrane under the action of a spring to pivot on the ball.

10. Microelectrovalve according to claim 9, wherein said conical face of said rocker is securely bonded to the upper face of the membrane.

11. Microelectrovalve according to claim 9, wherein said conical face of the rocker has a central compartment for positioning the rocker on the ball.

12. Microelectrovalve according to claim 10, and further comprising a ball for acting as a pivoting point for said rocker, and wherein said flange has a cup shaped profile with a central conical profile part receiving said ball.

13. Microelectrovalve according to claim 12, wherein said spool has an opening therein, and said microelectrovalve further comprises a spring, a rod on said rocker engaging said spring via said opening of said spool, and wherein said rocker has the general shape of a spinning top comprising a lower conical face which bears on an upper face of the membrane under the action of a spring and pivots on the ball.

* * * * *